(12) United States Patent
De Pasquale et al.

(10) Patent No.: US 9,167,494 B2
(45) Date of Patent: Oct. 20, 2015

(54) METHOD AND DEVICE FOR ENABLING HIGH-SPEED COMMUNICATION SERVICES IN MULTI-TECHNOLOGY WIRELESS NETWORK

(71) Applicant: Vodafone IP Licensing Limited, Newbury, Berkshire (GB)

(72) Inventors: Andrea De Pasquale, Madrid (ES); Francisco Javier Dominguez Romero, Madrid (ES)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 86 days.

(21) Appl. No.: 13/850,980

(22) Filed: Mar. 26, 2013

(65) Prior Publication Data
US 2013/0258999 A1    Oct. 3, 2013

(30) Foreign Application Priority Data

Mar. 27, 2012 (ES) .................................. 201230451

(51) Int. Cl.
*H04W 36/24* (2009.01)
*H04W 4/00* (2009.01)
*H04W 48/18* (2009.01)
*H04W 36/14* (2009.01)

(52) U.S. Cl.
CPC .............. *H04W 36/24* (2013.01); *H04W 36/14* (2013.01); *H04W 48/18* (2013.01)

(58) Field of Classification Search
CPC . H04W 36/0022; H04W 36/14; H04W 48/18; H04W 88/06
USPC .................................. 370/252, 331, 338, 329
See application file for complete search history.

(56) References Cited

U.S. PATENT DOCUMENTS

| | | | |
|---|---|---|---|
| 2009/0069013 A1* | 3/2009 | Thomas et al. | 455/436 |
| 2010/0099393 A1* | 4/2010 | Brisebois et al. | 455/418 |
| 2011/0319073 A1* | 12/2011 | Ekici et al. | 455/426.1 |
| 2013/0122899 A1* | 5/2013 | Panpaliya et al. | 455/432.1 |

FOREIGN PATENT DOCUMENTS

WO    WO 2009/035243 A2    3/2009

OTHER PUBLICATIONS

EPO: European Search Report for EP 13161207.9-1505 dated Mar. 9, 2013.

(Continued)

*Primary Examiner* — Charles C Jiang
*Assistant Examiner* — Will Lin
(74) *Attorney, Agent, or Firm* — Workman Nydegger

(57) ABSTRACT

A method and mobile device (UE) for enabling services in multi-RAT networks which support at least HSPA and LTE, comprising: identifying an initial radio technology on which a UE requesting service is camped, within a current cell; determining an indication of coverage of another radio technology available on the current cell which provides higher speed access than the initial one; deciding carrying the service, either through the initial radio technology or the other one of higher speed access, according to the previous indication. The indication of coverage can be based on any of the following criteria or a combination of them is met: 1) Terminal is camped on a HSDPA capable or LTE capable cell, 2) HSDPA signal strength is higher than a threshold, 3) LTE signal strength is higher than a threshold, 4) Measurements on the Peak Rate of the UE in a past time and in a location.

12 Claims, 3 Drawing Sheets

(56) References Cited

OTHER PUBLICATIONS

Telecom Italia et al: "Support for RAT indicator in idle mode", 3GPP Draft; R2-082241, 3rd Generation Partnership Project (3GPP), Mobile Competence Centre ; 650, Route Des Lucioles ; F-06921 Sophia-Antipolis Cedex ; France, vol. RAN WG2, No. Kansas City, USA; 20080429, Apr. 29, 2008, XP050140008, [retrieved on Apr. 29, 2008].

Spanish Search Report for 201230451 dated Mar. 27, 2012.

\* cited by examiner

METHOD AND DEVICE FOR ENABLING HIGH-SPEED COMMUNICATION SERVICES IN MULTI-TECHNOLOGY WIRELESS NETWORK

CROSS REFERENCE TO RELATED APPLICATIONS

This application claims priority to Spanish Application Number P201230451, filed on Mar. 27, 2012, the entirety of which is incorporated herein by reference.

TECHNICAL FIELD OF THE INVENTION

The present invention has its application within the telecommunications sector and, especially, in the industrial area engaged in providing users with User Equipments (UEs) capable of communicating through wide area cellular networks which support multiple wireless communications technologies: Second Generation or 2G (GSM, GPRS), Third Generation or 3G (UMTS, HSPA) and Beyond 3G or 4G (LTE, LTE-Advanced, ... ).

More particularly, the invention described herein relates to a method and a User Equipment for enabling the optimal provision of high-speed services in multi-Radio Access Technology mobile networks.

BACKGROUND OF THE INVENTION

In UMTS (Universal Mobile Telecommunications System) cell reselection, a user equipment (UE) typically stays in the 3G radio access technology as long as there is coverage. Only when the 3G coverage vanishes, does a User Equipment (UE) camp on the 2G radio access technology (GSM or GPRS). This means that a subscriber using a 3G phone will camp on 3G unless 3G coverage vanishes. Because cell reselection policies favour camping on the "newest" (i.e. implemented most recently) radio access technology, this causes camping loading and traffic loading tend to be accumulated in the newest Radio Technology.

With the introduction of $4^{th}$ Generation (4G) radio technology, the mobile networks have to handle the co-existence of different Radio Technologies such as UMTS-UTRAN (Universal Mobile Telecommunication System-Radio Access Network), Higher Speed Packet Access technologies (HSPA, HSPA+, etc.) implemented in UMTS and Long Term Evolution (LTE) technology, among others, in addition to the existing 2G technologies: the coverage from each of these technologies may substantially overlap.

The multi-RAT mobile network operators have to select the most suitable RAT (Radio Access Technology) for delivering services to any given subscriber at any given time, taking account of such issues as whether the subscriber's mobile terminal or User Equipment (UE) is in the idle state or in a connected mode.

Therefore, a Mobile Network Operator (MNO) may decide to direct the subscriber first to 3G, even if the LTE coverage is good enough, for several reasons (e.g. CS call setup time, efficiency in resource management, network stability); when it does so, each UE is initially connected to 3G radio access. As a consequence, the UE supporting 3G and LTE shows a 3G indication in the display of the terminal. From the user's point of view, this displayed 3G indicator could lead to the impression that the LTE network is deficient or that the terminal is not capable of connecting to LTE. From the point of view of service provisioning, once the decision of connection to 3G, instead of 4G, is taken by the MNO, the UE cannot be aware of the 4G coverage and, hence, certain services such as those requiring high-speed access can be affected negatively. There can be scenarios in which the initial selected radio technology, which the UE is camped on, is not the optimal one for carrying the service.

Today it is possible to implement (in the display of the UE) an indication of the current radio technology (2G, 3G) upon which the UE is camped and whether this technology is able to offer GPRS and/or HSPA. This current capability of the UE is pretty obvious as the UE is already attached to the technology displayed. However, it is not possible to obtain information in one RAT about the signal or presence of other RATs, in order to receive indication and display it in the UE.

There is therefore a need to optimise service provision, especially provisioning of high-speed communication services, in wireless networks where multiple radio technologies (2G, 3G, 4G, ... ) provide overlapping coverage to different subscribers, each technology providing their own coverage and Quality of Service (QoS) and subscribers having mobile terminals (User Equipments) which are capable of supporting every technology.

SUMMARY OF THE INVENTION

The present invention serves to address this need by providing the User Equipment (UE) with an indication of available coverage independently of the specific radio technology on which the UE is camped. Thus, this invention allows the UE and the user to be aware if a RAT providing higher speed access is available in the cell currently covered the connection of the UE, so that the UE can take determined actions on the services requested by the user.

An aspect of the invention refers to a method for enabling services in multi-technology mobile networks which support a plurality of radio technologies (e.g., HSPA and LTE), which comprises the following steps:
- identifying a first radio technology on which a UE requesting a service is camped, within a current cell,
- determining an indication of coverage of a second radio technology available for the UE which provides a higher speed access than the first radio technology,
- deciding carrying the requested service based on the previous indication by determining whether the service is to be carried through the first or the second radio technology in accordance to the indication of coverage.

Another aspect of the invention deals with a network entity of a radio access network (RAN) (e.g., a Radio Network Controller—RNC—or an evolved NodeB—eNodeB—) which comprises communicating means for exchanging information with a multi-technology capable mobile terminal device or User Equipment (UE) and processing means for performing the method described before.

A further aspect of the invention refers to a computer program product which comprises program code means to be loaded into processing means of a network entity (e.g., RNC or eNodeB) which belongs to a RAN (in a network supporting a plurality of radio technologies) in order to execute the described method.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

A preferred embodiment of the invention is focused on a method of enabling optimal provision of services in a mobile network supporting at least two radio technologies (e.g., UMTS and LTE). The mobile network has the knowledge on the identification of the radio technology, because the Radio Network Controller (RNC) in 3G radio access and the evolved NodeB (enodeB) in 4G-LTE are aware of the available technologies within the geographical area, i.e., within each cell, from which a service is requested, thanks to internal database configured by the mobile network operator in said controller nodes, RNC and eNodeB, of the 3G and 4G radio access networks respectively. The User Equipment (UE) which requests the service on behalf of a subscriber to said mobile network can be aware of the LTE coverage though the information provided by the lower protocol layers (i.e., Layer 1 or physical layer and Layer 3 RRC—Radio Resource Control—as defined in the Standards) of the radio protocol stack in the UE. This information, once taken from these lower layers, can be translated to an indicator of LTE coverage and delivered to the user by displaying it at the user's mobile terminal (i.e., the UE), for example, and icon appearing in a certain area of its screen can indicate LTE coverage to the user.

Figure 1:
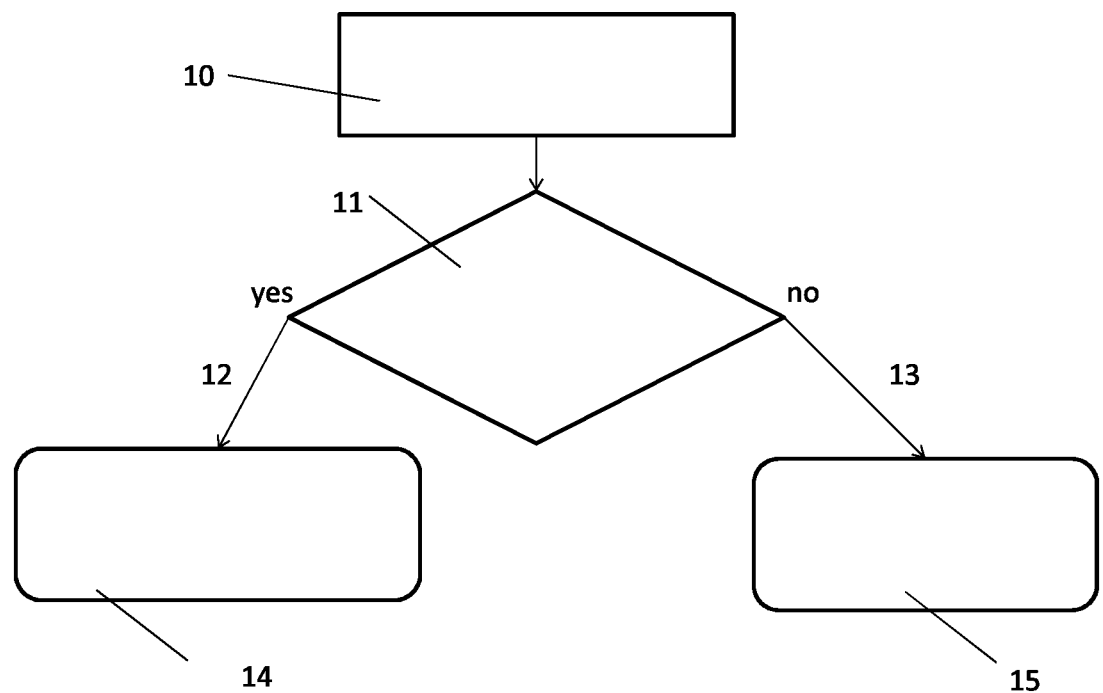
FIG. 1 shows a flow chart of a method of enabling service provisioning in a mobile network with multiple radio technologies by deciding the optimal radio technology for carrying service, in accordance to an embodiment of the invention.

FIG. 1 shows how the RNC can decide upon the radio technology which is to carry the service requested by a UE. The RNC knows the identity of the (first or initial) radio technology on which the UE is camped 10 and determines a high speed network indicator 11 (i.e., an indication of coverage provided by a second radio technology which provides a higher speed access than the initial radio technology). Where such second radio technology is indicated as available 12, the RNC decides that the service is to be carried using said high speed network 14 (e.g., LTE network). Otherwise, if the high speed network indicator (e.g., LTE coverage Indicator) indicates there is no coverage from a network of higher speed access 13, the RNC decides 15 either denying the request of service to the UE or carrying the service through the first radio technology on which the UE is initially camped.

The LTE coverage Indicator can be obtained in different ways:

A) By a new message in the System Information of the UTRAN (generated at the RRC layer with the parameters from the System Information Blocks—SIBs—).

Figure 2:
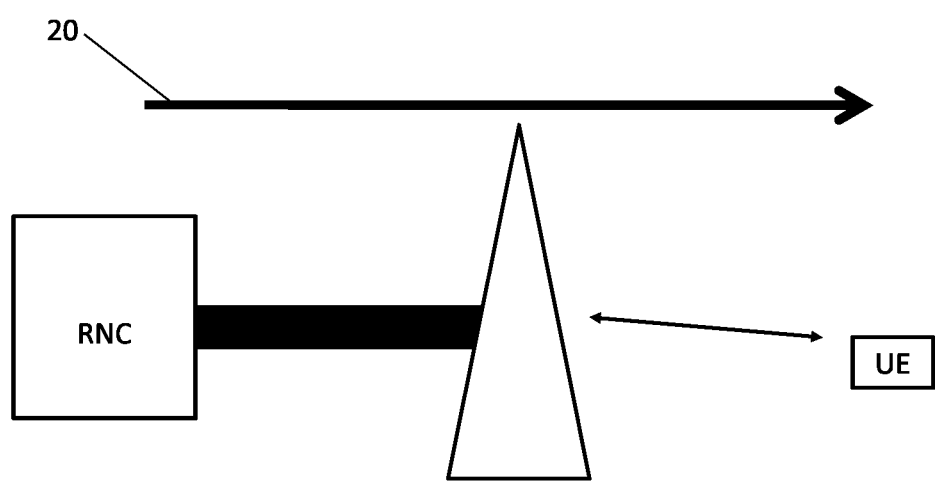
FIG. 2 shows a flow diagram of a High Speed Network coverage indicator used by the method of enabling optimal service provisioning in multi-RAT networks, in accordance to a preferred embodiment of the invention.

The RNC is responsible for UTRAN system information management. In accordance with 3GPP TS 25.331 a new Information Element can be introduced by the MNO to indicate there is an overlapped coverage of an LTE cell. A "LTE coverage indication" can be defined as the new Information Element (IE) included in the System Information of the UTRAN. FIG. 2 shows the RNC sending such an IE, an LTE coverage indication message 20, to the UE through the connected NodeB. The UE in idle mode can read the LTE coverage indication message 20 whilst in 3G coverage and use it to provide an LTE coverage Indication to the user. This mechanism is only possible if the UE is in idle mode. This is configured directly by the operator.

The current standards defining the System Information Blocks (SIBs) of the UTRAN do not specify such an IE on "LTE coverage indication", as shown in the following Table 1. Therefore, the new IE could be introduced with the elements shown in Table 2, based on a suitable SIB from the standards.

Table 1 shows a partial example of the System Information Block type 5 and 5bis described in 3GPP TS 25.331, V8.1.0 (2007-12). The system information block type 5 contains parameters for the configuration of the common physical channels in the cell. System information block type 5bis uses the same structure as System information block type 5. System information block type 5bis is sent instead of system information block type 5 in cells that use Band IV or Band IX or Band X if it is broadcasted.

TABLE 1

| Information Element/Group name | Need | Type and reference | Semantics description | Version |
|---|---|---|---|---|
| SIB6 Indicator | MP | Boolean | TRUE indicates that SIB6 is broadcast in the cell. When the UE receives SIB5 in the System Information Container message, this IE is interpreted as FALSE | |
| PhyCH information elements | | | | |
| PICH Power offset | MP | PICH Power offset 10.3.6.50 | If the cell is operating in MBSFN mode as indicated in subclause 8.1.1.6.3 the UE behaves as if this IE would not have been received. | |

TABLE 1-continued

| Information Element/Group name | Need | Type and reference | Semantics description | Version |
|---|---|---|---|---|
| CHOICE mode | MP | | | |
| >FDD | | | | |
| >>AICH Power offset | MP | AICH Power offset 10.3.6.3 | If the cell is operating in MBSFN mode as indicated in subclause 8.1.1.6.3 the UE behaves as if this IE would not have been received. | |
| >TDD | | | | |
| >>PUSCH system information | OP | PUSCH system information 10.3.6.66 | If the cell is operating in MBSFN mode as indicated in subclause 8.1.1.6.3 the UE behaviour upon reception of this IE is unspecified. | |
| >>PUSCH system information VHCR | OP | PUSCH system information VHCR 10.3.6.66a | Only for 7.68 Mcps TDD If the cell is operating in MBSFN mode as indicated in subclause 8.1.1.6.3 the UE behaviour upon reception of this IE is unspecified. | REL-7 |
| ... | | | | |

MP stands for Mandatory Present, i.e., a value for that information is always needed, and no information is provided about a particular default value. If ever the transfer syntax allows absence (e.g., due to extension), then absence leads to an error diagnosis.

OP means Optional, i.e., the presence or absence is significant and modifies the behaviour of the receiver. However whether the information is present or not does not lead to an error diagnosis.

Table 2 shows a possible structure of the new Information Element for LTE coverage Indicator proposed before.

TABLE 2

| Information Element/Group name | Need | Type and reference | Semantics description | Version |
|---|---|---|---|---|
| LTE coverage indicator | OP | Enumerated (LTE coverage indicator) | Default is LTE coverage is not present 'LTE coverage indicator' means that the UE may consider this cell as part of the LTE coverage area for display | REL-?? |

And similarly, a new message can be defined in 2G.

B) Obtain the information from the measurements of LTE signal level in the neighbours cell.

This way of obtaining an indication of LTE coverage can be applied when the UE is either idle or connected.

When the UE is in idle mode in LTE, the LTE indicator is enabled.

If the UE is in Idle mode and if LTE cells are part of the neighbour list of the current 3G cell (the list is provided by current standard System Information IEs), the UE measures the LTE signal of the cells indicated in the neighbour list, and if at least one cell with enough signal is available, the LTE Indicator is enabled.

If the UE is in Idle mode camped on 3G but no LTE cells are in the 3G neighbour list, the LTE Indicator is disabled.

Figure 3:
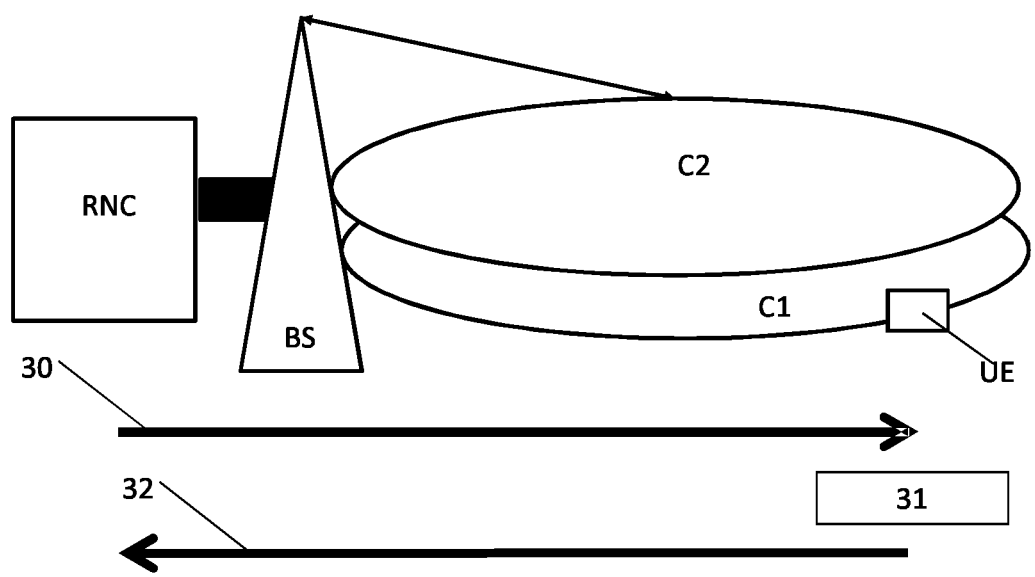
FIG. 3 shows a flow diagram of information on neighbour cells used for obtaining the High Speed Network coverage indicator, in accordance to a possible embodiment of the invention.

FIG. 3 shows the RNC sending the neighbour list 30 to the UE camped on 3G. This UE is assumed to have available both 3G coverage C1 and LTE coverage C2. The coverage is provided by the base station BS under the control of the RNC. In LTE, both entities are integrated in a eNodeB; in UMTS, the BS is a NodeB connected to the RNC.

If the UE is connected (Dedicated 3G mode) and if there is no list of neighbour cells, then the LTE indicator is disabled. The UE cannot see the LTE cells until it enters Compressed mode. Compressed mode is a mode triggered by the network as it is defined in 3GPP. In Compressed mode, the transmission and reception are stopped for a short time and the measurements are performed on other frequency or radio technology in that time. After the time is over, the transmission and reception resumes; so, when there is compressed mode, then the UE is able again to measure the LTE signals. Based on these LTE measurements, sent to the RNC with a measurement report 32, the UE can detect or determine 31 whether there is LTE coverage or not. Therefore, the MNO defines a signal quality/power threshold to decide if the LTE coverage is sufficient to warrant the LTE indicator being activated. Otherwise, that is, the UE is in 3G Dedicated mode but not in Compressed mode, the LTE indicator is the one determined at the idle state.

The same definition of signal threshold to indicate coverage is applicable to 2G. If the UE is in 2G connected mode, the process is similar but it is not needed to do compressed mode, as in 2G the mobile can do LTE measurements without this feature. Once detected the LTE cells, the LTE indicator is enabled. When the UE is in idle mode, the LTE Indicator is enabled in the same way above explained, i.e., if any LTE cell with enough signal is neighbour of the current 2G cell.

An alternative or complementary implementation of obtaining the LTE indication introduced into the UE Terminal is to define a flag "Very High Speed Coverage Indicator". This very high speed indicator takes into account that HSDPA, according to the latest features of 3GPP release 7, 8 and 9, have a performance similar to LTE. These features are for example: Dual Cell, Multicarrier, MIMO, and 64QAM. The "Very High Speed Coverage Indicator" can be displayed by the UE when any of the following criteria or a combination of them (e.g., combining criteria i and any of ii-iv) is met:

i) Terminal is camped on a HSDPA capable or LTE capable cell. In this case the operator can consider that HSDPA (with the previous features included) can provide a very high speed indicator to the customer.

ii) HSDPA signal strength is higher than a threshold configurable by the MNO or derived by the signal power measurements and the idle mode selection criteria described before. In this case the operator considers that the very high speed throughput is reached when the signal is higher than certain level.

iii) LTE signal strength is higher than a threshold configurable by the MNO or derived by the signal power measurements and the Idle mode selection criteria described before. Similar to the previous item, the high speed throughput even for an LTE network can be considered with a signal level threshold.

iv) Measurements on the Peak Rate achievable by the UE in a certain past time range, e.g., determining whether the user has been able to reach x Mbps Peak Rate in Downlink or Uplink in the same location in the previous Y minutes. This is directly measurements of throughput and then with configuration parameters, the throughput can be consider very high speed or not.

The present invention allows subscribers to receive a meaningful indication of the network capability in their coverage area independently of which technology is actually selected by the mobile network operator in order to carry the service.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. In a mobile telecommunication system that includes a first radio technology and a second radio technology that can both provide communication services to a User Equipment, where the second radio technology provides a higher speed access to the telecommunication system than the first radio technology, a method for a network entity of the mobile telecommunication system to optimize the provisioning of high-speed communication services to the User Equipment when the first and second radio technologies provide overlapping coverage that is useable by the User Equipment, the method comprising:

identifying at the network entity a first radio technology on which a User Equipment requesting a service is camped, determining at the network entity whether a second radio technology is available for the User Equipment that provides a higher speed access than the first radio technology;

determining at the network entity an indication of coverage of a signal measurement of the second radio technology, which is available for the User Equipment and provides a higher speed access than the first radio technology, comparing at the network entity the determined signal measurement with a threshold, upon the result of the comparison indicating that the second radio technology is of sufficient coverage, activating a high speed network indicator on the User Equipment, wherein the high speed network indicator is activated even when the User Equipment remains camped on the first radio technology such that the User Equipment or a user of the User Equipment are aware of the second radio technology, and determining whether to carry out a requested service on the first radio technology or the second radio technology based on the activated high speed network indicator.

2. The method according to claim 1, further comprising also activating the high speed network availability indicator upon determining that the User Equipment reached a certain peak through put in its current location.

3. The method according to claim 1, wherein determining whether a second radio technology is available comprises determining whether High Speed Packet Access is available for the User Equipment in a current cell, in which the User Equipment is located.

4. The method according to claim 1, wherein the determined signal measurement is a measurement of signal strength, signal quality, or signal power.

5. The method according to claim 1, wherein determining whether a second radio access technology is available comprises determining whether the radio access network to which the User Equipment is connected provides Long Term Evolution in a certain location.

6. The method according to claim 5, wherein determining whether a second radio technology is available for the User Equipment further comprises determining whether there is available coverage of Long Term Evolution in a cell via an Information Element defined in the System Information supplied from a Universal Mobile Telecommunications System (UMTS) radio access network.

7. The method according to claim 5, wherein determining whether a second radio technology is available for the User Equipment further comprises determining whether there is available coverage of Long Term Evolution in a location by comparing a measured strength of a signal carried on Long Term Evolution when the User Equipment is either in Idle mode or in Compressed mode with the threshold which is configured by a mobile network operator.

8. The method according to claim 1, wherein the user equipment is located in a current cell and the step of determining whether a second radio technology is available for the User Equipment comprises determining whether the current cell has a neighboring cell providing Long Term Evolution that is available to the User Equipment.

9. A non-transitory computer readable medium product comprising program codes which, when executed by a processor of a node in a radio access network, make said program codes perform the method according claim 1.

10. A Network entity of a radio access network, the radio access network including a first radio technology and a second radio technology that can both provide communication services to a User Equipment, where the second radio technology provides a higher speed access than the first radio technology, the Network entity, comprising a memory and a processor, configured to communicate with a User Equipment to thereby optimize the provisioning of high-speed communication services to the User Equipment when the first and second radio technologies provide overlapping coverage that is useable by the User Equipment by performing the following:
- identifying a first radio technology on which a User Equipment requesting a service is camped,
- determining whether a second radio technology is available for the User Equipment that provides a higher speed access than the first radio technology;
- determining an indication of coverage of a signal measurement of the second radio technology, which is available for the User Equipment and provides a higher speed access than the first radio technology,
- comparing the determined signal measurement with a threshold,
- upon the result of the comparison indicating that the second radio technology is of sufficient coverage, activating a high speed network indicator on the User Equipment, wherein the high speed network indicator is activated even when the User Equipment remains camped on the first radio technology such that the User Equipment or a user of the User Equipment are aware of the second radio technology, and
- determining whether to carry out a requested service on the first radio technology or the second radio technology based on the activated high speed network indicator.

11. The Network entity according to claim 10 which is implemented in a RNC.

12. The Network entity according to claim 10 which is implemented in an eNodeB.

* * * * *